United States Patent
Shikata et al.

(10) Patent No.: US 10,025,402 B2
(45) Date of Patent: Jul. 17, 2018

(54) OPERATING DEVICE FOR VEHICLE

(71) Applicant: TOYOTA JIDOSHA KABUSHIKI KAISHA, Toyota-shi, Aichi-ken (JP)

(72) Inventors: Hiroshi Shikata, Nisshin (JP); Naoki Kamiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/124,108

(22) PCT Filed: Mar. 6, 2015

(86) PCT No.: PCT/IB2015/000287
§ 371 (c)(1),
(2) Date: Sep. 7, 2016

(87) PCT Pub. No.: WO2015/136348
PCT Pub. Date: Sep. 17, 2015

(65) Prior Publication Data
US 2017/0017312 A1    Jan. 19, 2017

(30) Foreign Application Priority Data
Mar. 11, 2014  (JP) ................................ 2014-048198

(51) Int. Cl.
*G06F 3/038* (2013.01)
*G06F 3/041* (2006.01)
(Continued)

(52) U.S. Cl.
CPC ............ *G06F 3/0383* (2013.01); *B60K 35/00* (2013.01); *G06F 3/03547* (2013.01);
(Continued)

(58) Field of Classification Search
CPC ........................... G06F 3/03547; G06F 3/0383
(Continued)

(56) References Cited

U.S. PATENT DOCUMENTS

| | | | | |
|---|---|---|---|---|
| 6,084,572 A | * | 7/2000 | Yaniger | G06F 3/0338 345/156 |
| 2002/0158843 A1 | * | 10/2002 | Levine | B25J 9/1692 345/156 |

(Continued)

FOREIGN PATENT DOCUMENTS

| | | |
|---|---|---|
| JP | H09-33275 A | 2/1997 |
| JP | 2003-532947 A | 11/2003 |

(Continued)

*Primary Examiner* — Michael Pervan
(74) *Attorney, Agent, or Firm* — Oliff PLC

(57) ABSTRACT

An operating device for a vehicle includes a display, a touch operation surface set at a first predetermined position and pushable and returnable to the first predetermined position after being pushed, a coordinate detecting unit to detect a coordinate indicating a touch position of an operating finger on the touch operation surface, a push detecting unit to detect the push of the touch operation surface, and a control unit to display a cursor in a screen displayed on the display based on the coordinate detected by the coordinate detecting unit and to perform operation details of an item in the screen selected by the cursor based on the push of the touch operation surface detected by the push detecting unit. The control unit does not update the position of the cursor within a predetermined amount of time after the push detecting unit detects the push of the touch operation surface.

5 Claims, 14 Drawing Sheets

(51) Int. Cl.
*G06F 3/0481* (2013.01)
*G06F 3/0354* (2013.01)
*B60K 35/00* (2006.01)
*G06F 3/0482* (2013.01)
*G06F 3/0488* (2013.01)

(52) U.S. Cl.
CPC .......... *G06F 3/0418* (2013.01); *G06F 3/0481* (2013.01); *B60K 2350/104* (2013.01); *B60K 2350/1028* (2013.01); *G06F 3/0482* (2013.01); *G06F 3/0488* (2013.01); *G06F 2203/04105* (2013.01)

(58) Field of Classification Search
USPC ............ 178/18.01–19.07; 345/157, 173–178
See application file for complete search history.

(56) References Cited

U.S. PATENT DOCUMENTS

| | | |
|---|---|---|
| 2009/0207152 A1 | 8/2009 | Nakamura |
| 2010/0079404 A1 | 4/2010 | Degner et al. |
| 2012/0056730 A1 | 3/2012 | Ujiie et al. |
| 2013/0038551 A1 | 2/2013 | Shirai et al. |

FOREIGN PATENT DOCUMENTS

| | | |
|---|---|---|
| JP | 2006-096249 A | 4/2006 |
| JP | 2012-190185 A | 10/2012 |
| JP | 2013-037566 A | 2/2013 |
| JP | 2013-054725 A | 3/2013 |
| WO | 2011/111302 A1 | 9/2011 |
| WO | 2013/142468 A1 | 9/2013 |

\* cited by examiner

OPERATING DEVICE FOR VEHICLE

BACKGROUND OF THE INVENTION

1. Field of the Invention

The present invention relates to an operating device for a vehicle.

2. Description of Related Art

An operating device is known in which a cursor is shifted to a desired operation menu displayed on an operation screen using a cursor switch or the like and a function thereof is performed. In such an operating device, since there is a case in which it is difficult to shift the cursor to a desired operation menu using the cursor switch or the like, a technique for improving operability has been proposed.

For example, Japanese Unexamined Patent Application Publication No. 2006-096249 (JP 2006-096249 A) discloses an information display device for a vehicle that automatically returns a cursor to an operation menu displayed substantially at the center of a screen which is a standby position when a cursor switch is not operated for a predetermined amount of time. Accordingly, it is possible to easily operate an operation menu in the vicinity of the center of the screen which has been difficult to operate.

An operating device may be used which performs a function of a desired operation menu displayed on an operation screen by shifting a cursor to the desired operation menu through the use of a touch pad and pushing the touch pad.

However, in such an operating device, since a finger may be deformed or a finger may slip on an operation surface at the time of pushing the touch pad, there is a possibility that the cursor may move unintentionally. Accordingly, for example, when the touch pad is pushed in a state in which the cursor (pointer) is located in the vicinity of the boundary of the operation menu, the cursor may depart from the operation menu and thus there is a possibility that an operation intended by a user may not be performed.

SUMMARY OF THE INVENTION

The invention provides an operating device for a vehicle that can prevent a cursor from moving against an intention and reduce an erroneous operation due to the movement of the cursor against the intention at the time of selecting an operation menu by an operation on an operation surface of a touch pad and determining the operation menu by pushing the touch pad.

According to a first aspect of the invention, there is provided an operating device for a vehicle, including: a display; a touch operation surface that is set at a first predetermined position and that is configured to be pushable and to be returned to the first predetermined position after being pushed; a coordinate detecting unit configured to detect a coordinate indicating a touch position of an operating finger on the touch operation surface; a push detecting unit configured to detect a push of the touch operation surface; and a control unit configured to display a cursor in a screen that is displayed on the display based on the coordinate detected by the coordinate detecting unit and to perform operation details of an item in the screen selected by the cursor based on the push of the touch operation surface detected by the push detecting unit. The control unit does not update the position of the cursor within a predetermined amount of time after the push detecting unit detects the push of the touch operation surface.

According to a second aspect of the invention, there is provided an operating device for a vehicle, including: a display; a touch operation surface that is set at a first predetermined position and that is configured to be pushable and to be returned to the first predetermined position after being pushed; a coordinate detecting unit configured to detect a coordinate indicating a touch position of an operating finger on the touch operation surface; a push detecting unit configured to detect a push of the touch operation surface; a position detecting unit configured to detect a position of the touch operation surface in a push direction of the touch operation surface; and a control unit configured to display a cursor in a screen that is displayed on the display based on the coordinate detected by the coordinate detecting unit and to perform operation details of an item in the screen selected by the cursor based on the push of the touch operation surface detected by the push detecting unit. The control unit corrects the position of the cursor to a position before a third predetermined amount of time when the position detecting unit detects that the touch operation surface is returned to the first predetermined position after the push detecting unit detects the push of the touch operation surface.

According to the invention, it is possible to provide an operating device for a vehicle that can prevent a cursor from moving against an intention and reduce an erroneous operation due to the movement of the cursor against the intention at the time of selecting an operation menu by an operation on an operation surface of a touch pad and determining the operation menu by pushing the touch pad.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

First Embodiment

Figure 1:
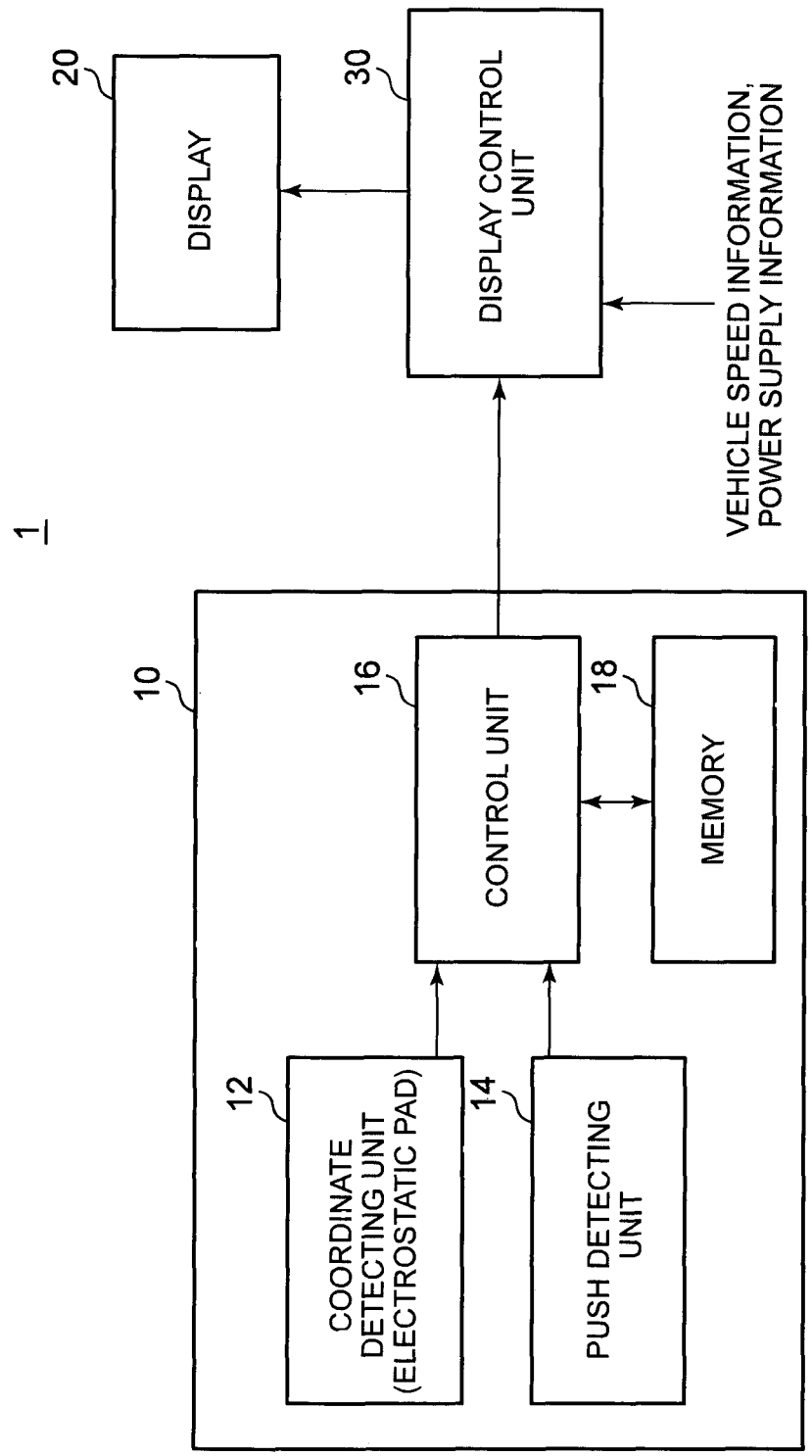
FIG. 1 is a block diagram illustrating a configuration example of an operating device for a vehicle according to a first embodiment.

FIG. 1 is a block diagram illustrating a configuration example of an operating device 1 for a vehicle.

The operating device 1 for a vehicle includes a touch pad 10, a display 20, and a display control unit 30.

Figure 2:
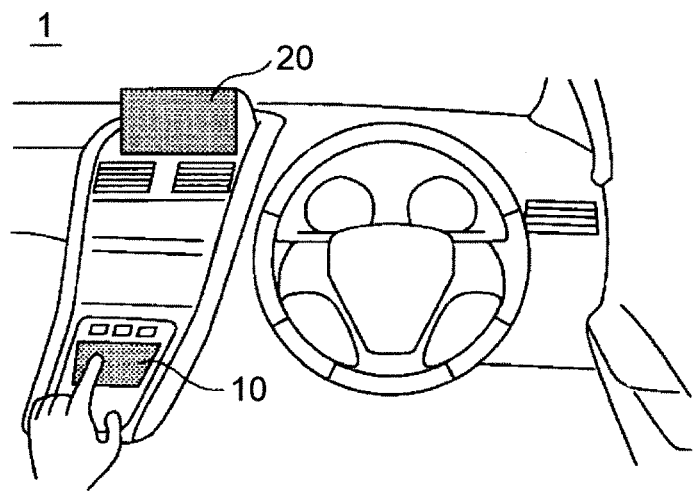
FIG. 2 is a diagram illustrating an arrangement example of a touch pad and a display.

The touch pad 10 is used to operate a screen (operation screen) that is displayed on the display 20. The touch pad 10 can be disposed at an appropriate interior position and can be preferably disposed at a position (which is reachable by a hand while keeping a driving posture) at which a driver can operate the touch pad 10. FIG. 2 is a diagram illustrating an arrangement example of the touch pad 10 and the display 20. The touch pad 10 may be disposed on a console box or in the vicinity thereof, for example, as illustrated in FIG. 2. The touch pad 10 includes a coordinate detecting unit 12, a push detecting unit 14, a control unit 16, and a memory 18, as illustrated in FIG. 1.

The touch pad 10 will be described below in detail with reference to FIGS. 3, 4.

Figure 3:
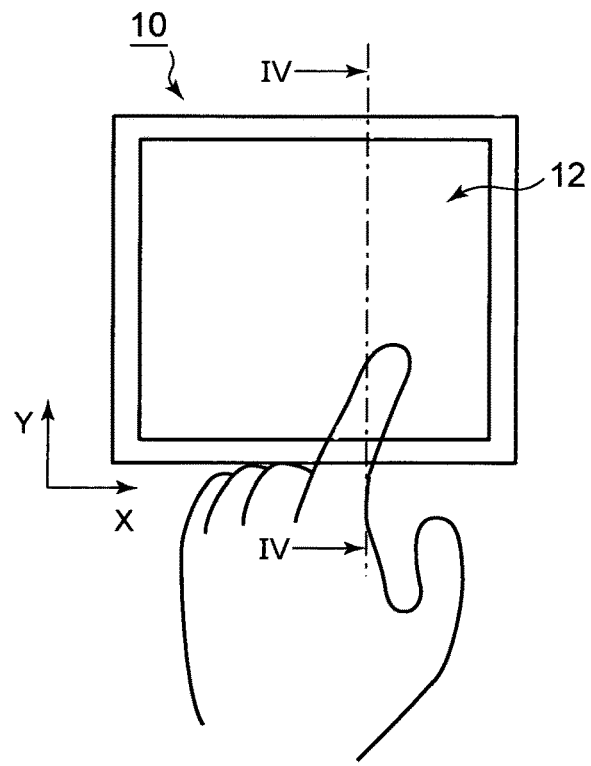
FIG. 3 is a plan view schematically illustrating the touch pad.

FIG. 3 is a plan view schematically illustrating the touch pad 10. FIG. 4 is a cross-sectional view schematically illustrating a principal part of the touch pad 10 and is specifically a cross-sectional view taken along line IV-IV of FIG. 3.

The coordinate detecting unit 12 includes a substantially-flat two-dimensional operation surface (touch operation surface) as illustrated in FIG. 3 and detects the coordinate position of an operator's finger (hereinafter, merely referred to as "operating finger") touching the touch operation surface. The coordinate detecting unit 12 includes, for example, an electrostatic capacitance sensor and outputs a detection signal to the control unit 16. The coordinate detecting unit 12 may be constituted, for example, by an electrostatic pad. In this case, the electrostatic pad has, for example, a structure in which electrodes (electrostatic capacitance sensors) extend in linear shapes with insulators interposed therebetween in the X direction and the Y direction on a plane, and may output detection signals (signals corresponding to a variation in the amount of charge that can be stored in the electrodes) of the electrodes to the control unit 16.

Figure 4:
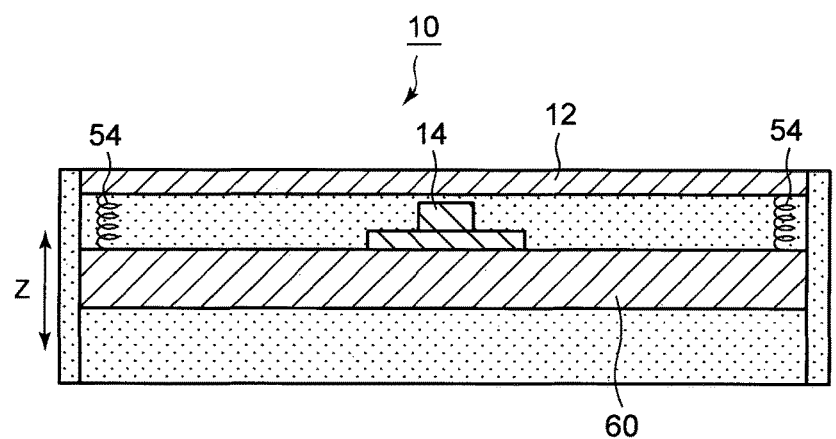
FIG. 4 is a cross-sectional view schematically illustrating a principal part of the touch pad.

The coordinate detecting unit 12 is configured to be movable in the vertical direction (Z direction in FIG. 4). That is, the coordinate detecting unit 12 (touch operation surface) is configured to be pushable and to be returned to an original position (initial position (first predetermined position) before being pushed) after being pushed. A unit (mechanism) for allowing the coordinate detecting unit 12 to move upward and downward may be arbitrary. In the example illustrated in FIG. 4, the coordinate detecting unit 12 is configured to be movable upward and downward by being supported by a substrate 60 via an elastic portion 54. The upward and downward stroke of the coordinate detecting unit 12 may be arbitrary or minute, as long as the downward movement of the coordinate detecting unit 12 can be detected by the push detecting unit 14 to be described later.

The push detecting unit 14 detects the downward movement of the coordinate detecting unit 12 (the operation surface of the touch pad 10), that is, the push of the operation surface of the touch pad 10 by an operator. The push detecting unit 14 outputs a signal indicating the downward movement of the coordinate detecting unit 12 to the control unit 16. The push detecting unit 14 may be constituted, for example, by a tact switch or a pressure sensor (such as a piezoelectric element). The push detecting unit 14 may be disposed at an arbitrary position as long as it can come in contact with the coordinate detecting unit 12 with the downward movement of the coordinate detecting unit 12. In the example illustrated in FIG. 4, the tact switch, the pressure sensor, or the like constituting the push detecting unit 14 is disposed below the central portion of the coordinate detecting unit 12. The tact switch, the pressure sensor, or the like constituting the push detecting unit 14 may be distributed at plural positions.

The control unit 16 and the memory 18 may be constituted, for example, by a microcomputer.

The control unit 16 detects the touch of the operating finger with the touch operation surface on the basis of the output signal from the coordinate detecting unit 12. At this time, the control unit 16 generates a coordinate signal indicating a coordinate position in the touch operation surface, that is, a coordinate signal indicating the coordinate position (a touch position of an operating finger) touched by an operator. When the coordinate detecting unit 12 is constituted by an electrostatic pad, electric charges can be stored in a capacitor formed by the electrodes and the operating finger and thus a variation in the amount of electric charges differ in the electrodes depending on the position of the operating finger. Accordingly, the position of the operating finger can be specified on the basis of the detection signals from the electrodes. The generated coordinate signal is output to the display control unit 30.

The control unit 16 generates a determination signal indicating a determining operation by the operator on the basis of the output signal from the push detecting unit 14. For example, when the push detecting unit 14 is constituted by a pressure sensor and the output (push pressure) from the pressure sensor is greater than a predetermined threshold value, the determining operation by the operator may be detected and the determination signal may be generated. When the pressure sensor is distributed at plural positions and the outputs from several pressure sensors are greater than a predetermined threshold value, the determination signal may be generated. When the push detecting unit 14 is constituted by a tact switch and an ON signal is input from the tact switch, the determining operation by the operator may be detected and the determination signal may be generated. When the tact switch is distributed at plural positions and ON signals are input from several tact switches, the determination signal may be generated. The generated determination signal is transmitted to the display control unit 30.

Referring to FIG. 1 again, the display 20 is disposed at a position remote from the touch pad 10 and displays an operation screen which can be operated with the touch pad 10. The display 20 may be disposed at an appropriate interior position, that is, at a position which can be easily visually recognized by the operator (driver). For example, as illustrated in FIG. 2, the display 20 may be disposed on an instrument panel. The operation screen may be displayed directly in the viewing field of the operator like a head-up display (HUD). An operation screen showing operation details which can be operated with the touch pad 10 is displayed on the display 20. The display 20 may display an image of a TV, a periphery monitoring camera, or the like as the background of the operation screen. When the operation screen is not displayed, the display 20 may display an image of a TV, a periphery monitoring camera, or the like.

Figure 5:
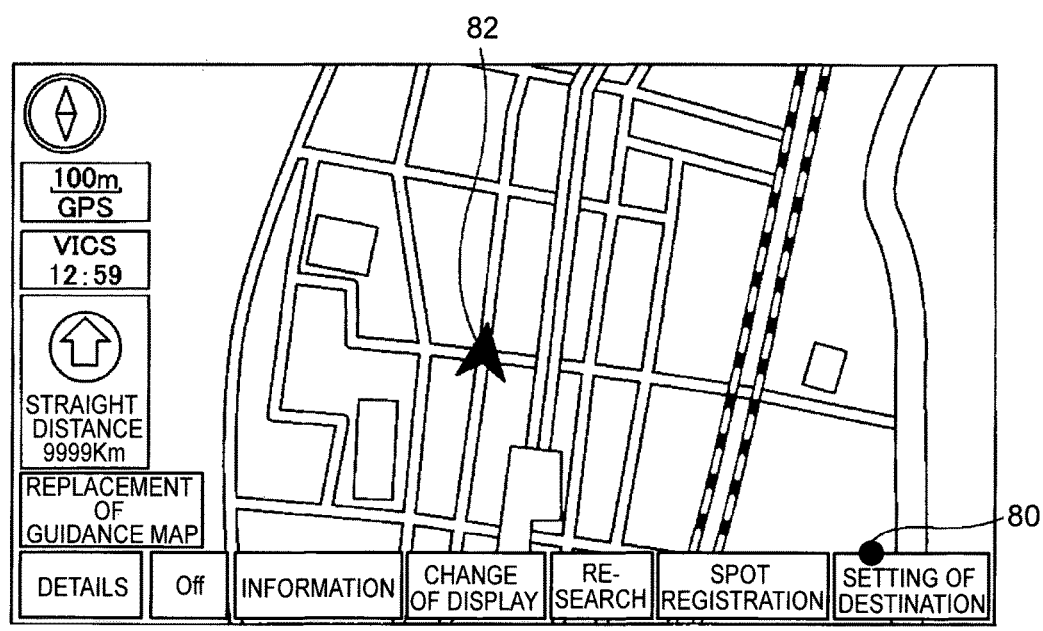
FIG. 5 is a diagram illustrating an example of a screen (operation screen) that is displayed on the display.

The operation screen that is displayed on the display 20 will be described below with reference to FIG. 5. FIG. 5 is a diagram illustrating an example of a screen (operation screen) that is displayed on the display 20. Specifically, FIG. 5 illustrates a map screen of a navigation apparatus. The operation screen may be displayed in the entire image display section of the display 20 or may be displayed in a part thereof, as illustrated in the drawing. In the following description, notations related to directions of "upper", "lower", "right", and "left" represent the upper side, the lower side, the right side, and the left side on the screen of the display 20.

Referring to FIG. 5, a map is displayed in the entire image display section of the display 20 and an arrow 82 indicating the position of a vehicle is displayed in the vicinity of the center of the map screen. Points on the map can be selected when the operator moves a pointer (cursor) 80 through the use of the touch pad 10. For example, the operator can select a start position or a destination in the navigation apparatus or select a position of a facility of which detailed information should be displayed by moving the pointer 80 to a desired position on the map. At this time, the operator can determine a start position or a destination or determine a facility of which detailed information should be displayed by performing a determining operation at a desired position on the map through the use of the touch pad 10. The map displayed on the screen of the display 20 may be scrolled (map scroll) by operating the touch pad 10. Icons (virtual buttons) indicating selection items to be operated are displayed at the left edge and the lower edge of the screen of the display 20. The operator can transition to a screen for setting a destination in the navigation apparatus, for example, by performing a determining operation in a state in which the pointer 80 is moved (selecting operation) onto the icon of "setting of destination" as illustrated in FIG. 5. In the screen for setting a destination, the operator may set a destination on the basis of a history of destinations set in the past, a registered spot list registered in advance, or a search result based on a phone number, an address, a free word, or the like. In the following description, the points on the map in the map screen may be described to be one selection item to be operated.

In this way, plural selection items (to be operated) are displayed on the operation screen and the operation details of the selection items are performed when the operator shifts the cursor to a selection item (selecting operation) and performs a determining operation through the use of the touch pad 10. The selection items that are displayed on the operation screen may include a selection item group (a list or map) which can be scrolled by the operator's operation on the touch pad. The selection items may include arbitrary types (functions). That is, details to be operated with the touch pad 10 may be arbitrary. For example, the selection items may include selection items for setting an air conditioner or selection items for displaying the screen on the display 20.

The display control unit 30 controls the screen that is displayed on the display 20. In this embodiment, the display control unit 30 assists the operation on the touch pad 10 by synchronizing the display 20 and the touch pad 10 with each other. Specifically, the display control unit 30 displays an operation screen on the display 20 and performs processes of selecting, determining, and the like various selection items on the basis of the signal (the coordinate signal or the determination signal) from the touch pad 10. For example, when the operator touches the touch operation surface of the touch pad 10 with a finger and performs a sliding operation (selecting operation), the display control unit 30 moves the cursor (which includes a pointer) on the operation screen with the operation and sets one selection item to a selected state. That is, the selecting function is realized with the operator's selecting operation (selecting process). When the operator pushes the touch pad 10 (determining operation) in a state in which one selection items is selected, the display control unit 30 realizes the operation details of the selected selection item. That is, the determining function is realized in response to the determining operation (determining process). The "cursor" used in the following description includes a "pointer" as long as not differently mentioned.

More specifically, when a coordinate signal corresponding to the operator's selecting operation is received from the touch pad 10 in a state in which an operation screen is displayed on the display 20, the display control unit 30 sets one selection item of the operation screen to a selected state. That is, the position of the cursor is determined. At this time, the display control unit 30 works in a relative coordinate mode.

Here, the relative coordinate mode means a mode in which the coordinate system of the screen of the display 20 is synchronized with the coordinate system of an operation surface of the touch pad 10 in a synchronous manner. In the relative coordinate mode, typically, the coordinate systems of the screen of the display 20 and the operation surface of the touch pad 10 are correlated with each other in such a way in which the origin of the coordinate system of the display 20 is located at the current position of the cursor and the origin of the coordinate system of the operation surface of the touch pad 10 is located at the current touch position of the operating finger on the operation surface. For example, when the operator touches the operation surface of the touch pad 10 with the operating finger and causes the operating finger to slide down, the cursor on the screen of the display 20 moves downward from the display position on the screen. At this time, the movement distance of the cursor on the screen of the display 20 is determined depending on the distance by which the operating finger slides on the operation screen.

When a determination signal from the touch pad 10 is received in a state in which the operation screen is displayed on the display 20, the display control unit 30 realizes the determining process, that is, the operation details of the selected selection item. The operation details depends on the selection item, and may be a screen transition such as displaying of lower-level selection items or changing of the operation screen or may be inputting of characters, starting of an application, transmitting of a control signal to a target device (such as an air conditioner), and the like.

The display control unit 30 is constituted, for example, by a microcomputer and may perform the aforementioned control processes by causing a CPU to execute various programs stored in a ROM. All or a part of the functions of the display control unit 30 may be realized by the control unit 16 of the touch pad 10 or another control unit (not illustrated) in the display 20. All or a part of the functions of the control unit 16 of the touch pad 10 may be realized by the display control unit 30. If necessary, vehicle speed information indicating a vehicle speed, power supply information related to the power supply state (IG, ACC) of the vehicle, and the like may be input to the display control unit 30.

In this way, with the touch pad 10 according to this embodiment, the operator can perform a selecting operation and select a desired selection item by touching the operation surface of the coordinate detecting unit 12 with an operating finger (for example, an index finger) and moving the operating finger in the operation surface while watching the display 20. When a desired selection item is selected, the operator can perform a determining operation by pushing the touch operation surface (the coordinate detecting unit 12) at the position with the operating finger.

Characteristic processes that are performed by the operating device 1 for a vehicle (the display control unit 30) will be described below. Specifically, a process of determining a cursor position when an operator performs a push operation (determining operation) on the operation surface will be described.

First, a touch position of an operating finger that is detected by the coordinate detecting unit 12 when an operator performs a push operation on the operation surface of the touch pad 10 will be described below.

Figure 6:
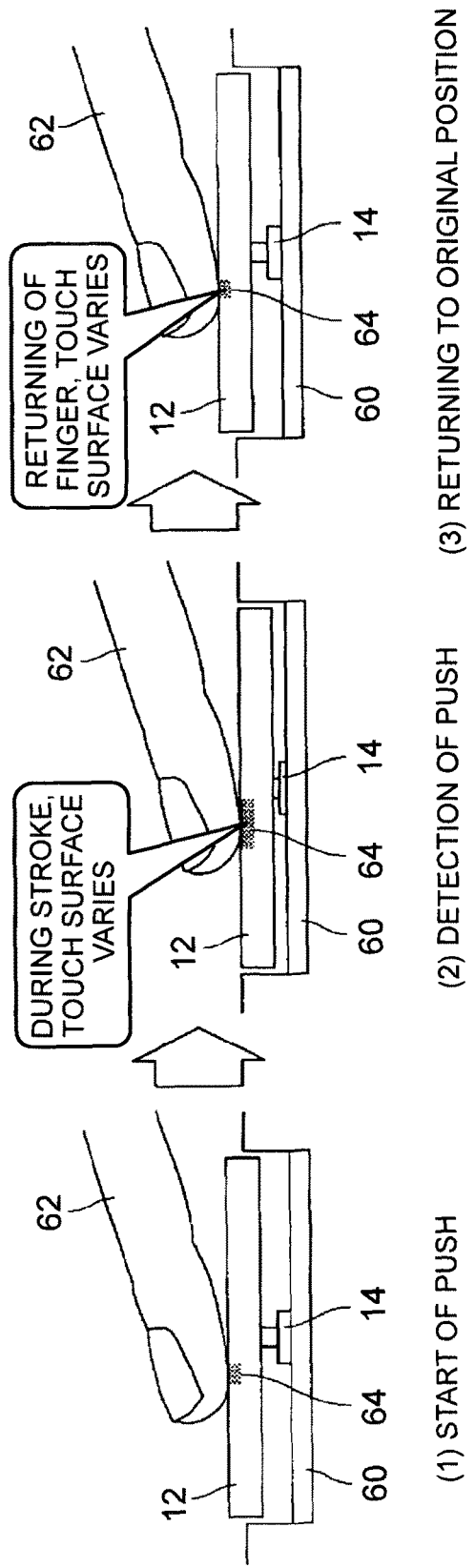
FIG. 6 is a diagram illustrating an example of a coordinate variation of an operating finger on a touch operation surface at the time of pushing the touch operation surface.

FIG. 6 is a diagram illustrating an example of a coordinate variation of an operating finger on the touch operation surface at the time of pushing the touch operation surface of the touch pad 10. In the drawing, touch states of the operating finger with the operation surface at times of (1) start of pushing of the operation surface, (2) detection of pushing of the operation surface by the push detecting unit 14, and (3) returning of the operation surface to an original position are illustrated from the left side.

Referring to FIG. 6, from (1) the start of pushing of the operation surface to (2) the detection of pushing of the operation surface by the push detecting unit 14, the operating finger 62 presses down the operation surface so as to push the operation surface (the coordinate detecting unit 12). Accordingly, the operating finger 62 touching the operation surface is deformed and a contact surface 64 of the operating finger 62 with the operation surface varies. From (2) the detection of pushing of the operation surface by the push detecting unit 14 to (3) the returning of the operation surface to the original position, the operating finger 62 moves upward to return the operation surface to the original position and the force applied to the operation surface is released. Accordingly, the operating finger 62 touching the operation surface is deformed into a shape before pushing the operation surface and the contact surface 64 of the operating finger 62 with the operation surface varies.

In this way, when the operator pushes the operation surface of the touch pad 10, the contact surface of the operating finger with the operation surface may vary in a shape that is not intended by the operator and the touch position of the operating finger that is detected by the coordinate detecting unit 12 may move.

Therefore, in the operating device 1 for a vehicle according to this embodiment, the process of determining the cursor position in consideration of the movement of the touch position of the operating finger when the operator pushes the operation surface of the touch pad 10 is performed.

Figure 7:
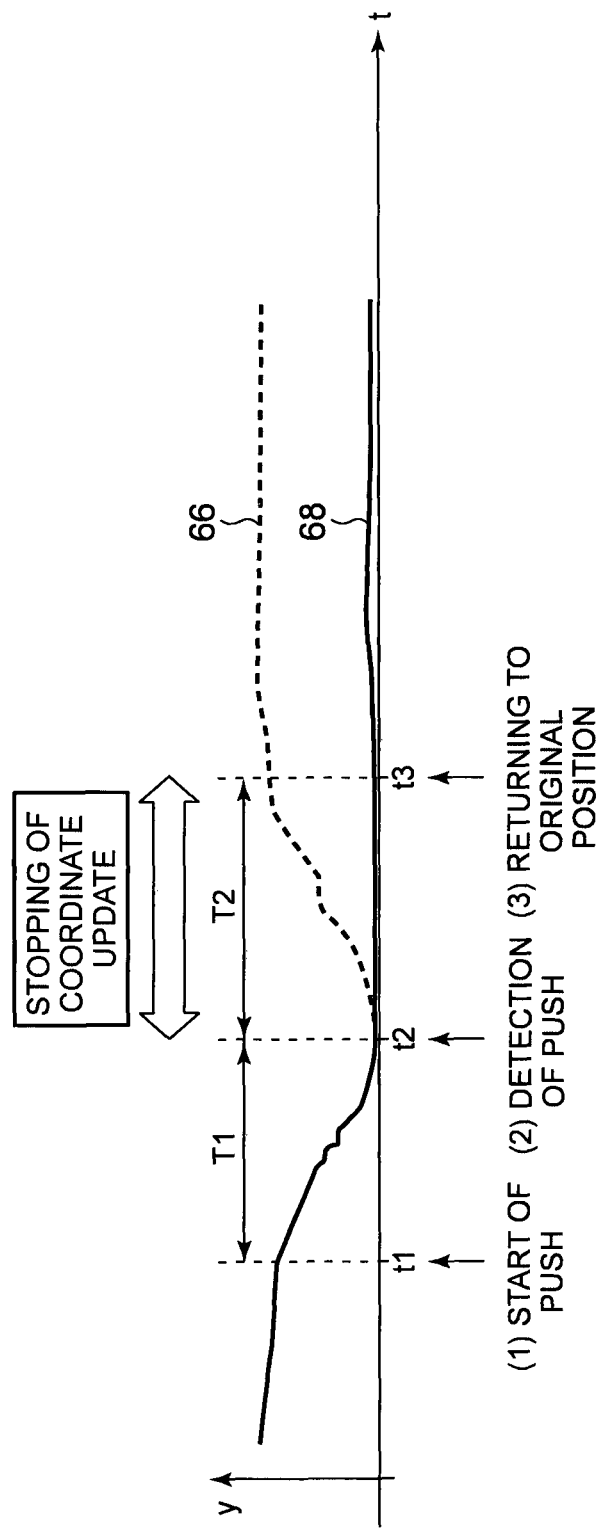
FIG. 7 is a diagram illustrating an operation example of the operating device (display control unit) for a vehicle according to the first embodiment.

FIG. 7 is a diagram illustrating an operation example of the operating device 1 for a vehicle (the display control unit 30) according to this embodiment. Specifically, FIG. 7 is a diagram illustrating an example of a temporal variation of the cursor position (Y coordinate in the XY coordinate system of the display 20) when the operator pushes the operation surface of the touch pad 10. Dotted line 66 represents the temporal variation of (the Y coordinate of) the cursor position that is determined depending on the coordinate signal input from the control unit 16 and solid line 68 represents the temporal variation of (the Y coordinate of) the cursor position when the process of determining the cursor position according to this embodiment is performed.

As described above with reference to FIG. 6, the coordinate indicating the touch position of the operating finger that is detected by the coordinate detecting unit 12 when the operation surface of the touch pad 10 is pushed may vary regardless of the operator's intention. Accordingly, like dotted line 66, when the cursor position is determined on the basis of the coordinate signal input from the control unit 16, the cursor position may vary with the variation of the touch position of the operating finger on the operation surface. Specifically, from time t1 of (1) the start of pushing of the operation surface to time t2 of (2) the detection of pushing of the operation surface by the push detecting unit 14, the cursor position varies in a direction in which the Y coordinate of the cursor decreases. Thereafter, from time t2 of (2) the detection of pushing of the operation surface by the push detecting unit 14 to time t3 of (3) the returning of the operation surface to the original position, the cursor position varies in a direction in which the Y coordinate of the cursor increases.

On the other hand, in the operating device 1 for a vehicle (the display control unit 30) according to this embodiment, when the push of the operation surface is detected by the push detecting unit 14 (when the determination signal is input from the control unit 16), the cursor position (coordinate) is not updated during a predetermined amount of time T2. Here, the predetermined amount of time T2 can be determined as a period of time corresponding to the period of time from time t2 of (2) the detection of pushing of the operation surface by the push detecting unit 14 to time t3 of (3) the returning of the operation surface to the original position. That is, in solid line 68, within the predetermined amount of time T2 from time t2 of (2) the detection of pushing of the operation surface by the push detecting unit 14, the cursor position (coordinate) is not updated and the cursor position does not vary within the predetermined amount of time T2 from time t2. After the predetermined amount of time T2 elapses from time t2 of (2) the detection of pushing of the operation surface by the push detecting unit 14, the updating of the cursor position based on the coordinate signal input from the control unit 16 is restarted.

Figure 8:
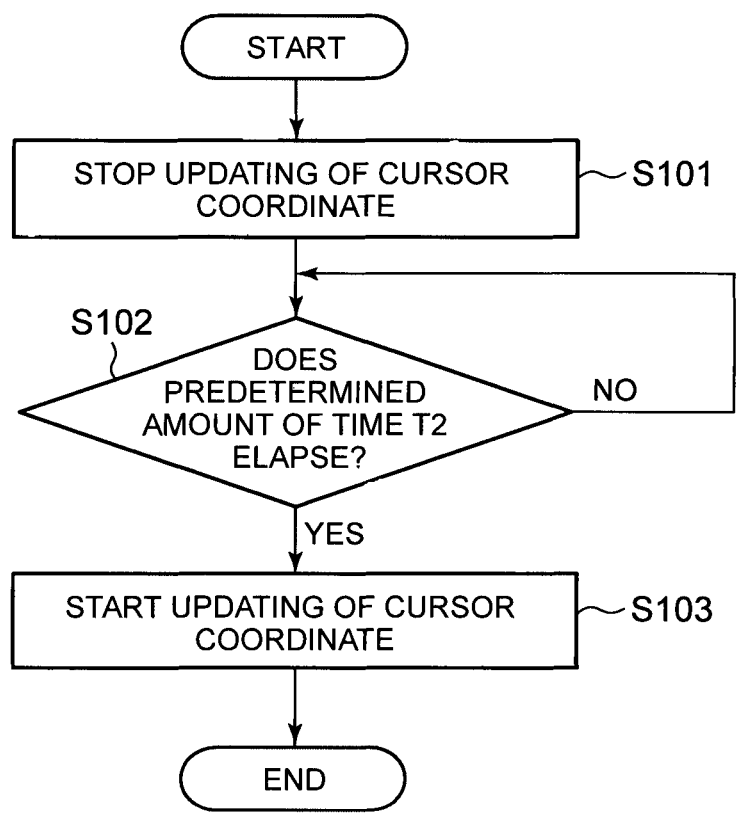
FIG. 8 is a flowchart illustrating an example of a process flow in the operating device (display control unit) for a vehicle according to the first embodiment.

FIG. 8 is a flowchart illustrating an example of a process flow in the operating device 1 for a vehicle (the display control unit 30) according to this embodiment and is specifically a flowchart illustrating the process flow of determining a cursor position when the operator pushes the operation surface (determining operation). More specifically, the processing operations in the display control unit 30 illustrated in FIG. 7 are illustrated as a process flow. The process flow is carried out whenever a determination signal is input from the control unit 16 (whenever the push of the operation surface of the touch pad 10 is detected by the push detecting unit 14).

Referring to FIG. 8, in step S101, updating of the cursor position (the coordinate of the cursor on the screen of the display 20) is stopped.

Subsequently, in step S102, it is determined whether a predetermined amount of time T2 elapses after a determination signal is input from the control unit 16 (after the push of the operation surface of the touch pad 10 is detected by the push detecting unit 14). When the predetermined amount of time T2 does not elapse, the determination is repeatedly carried out until the predetermined amount of time T2 elapses. When the predetermined amount of time T2 elapses, the process flow moves to step S103.

In step S103, the updating of the cursor position based on the coordinate signal (the touch position of the operating finger on the operation surface detected by the coordinate detecting unit 12) input from the control unit 16 is restarted and the process flow ends.

In this way, by not updating the cursor position within the predetermined amount of time T2 after the push of the operation surface of the touch pad 10 is detected, it is possible to suppress movement of the cursor position due to the variation in the touch position of the operating finger until the operation surface is returned to the original position after the push of the operation surface is detected. Accordingly, it is possible to reduce an erroneous operation due to unintentional movement of the cursor. Particularly, when the operation of pushing the operation surface at the same cursor position is performed multiple times like the operation on a scroll button, it is possible to prevent the cursor from being dropped from the scroll button while performing the push operation multiple times.

Second Embodiment

A second embodiment will be described below. Hereinafter, the same elements as in the first embodiment will be referenced by the same reference signs and different elements will be mainly described below.

Figure 9:
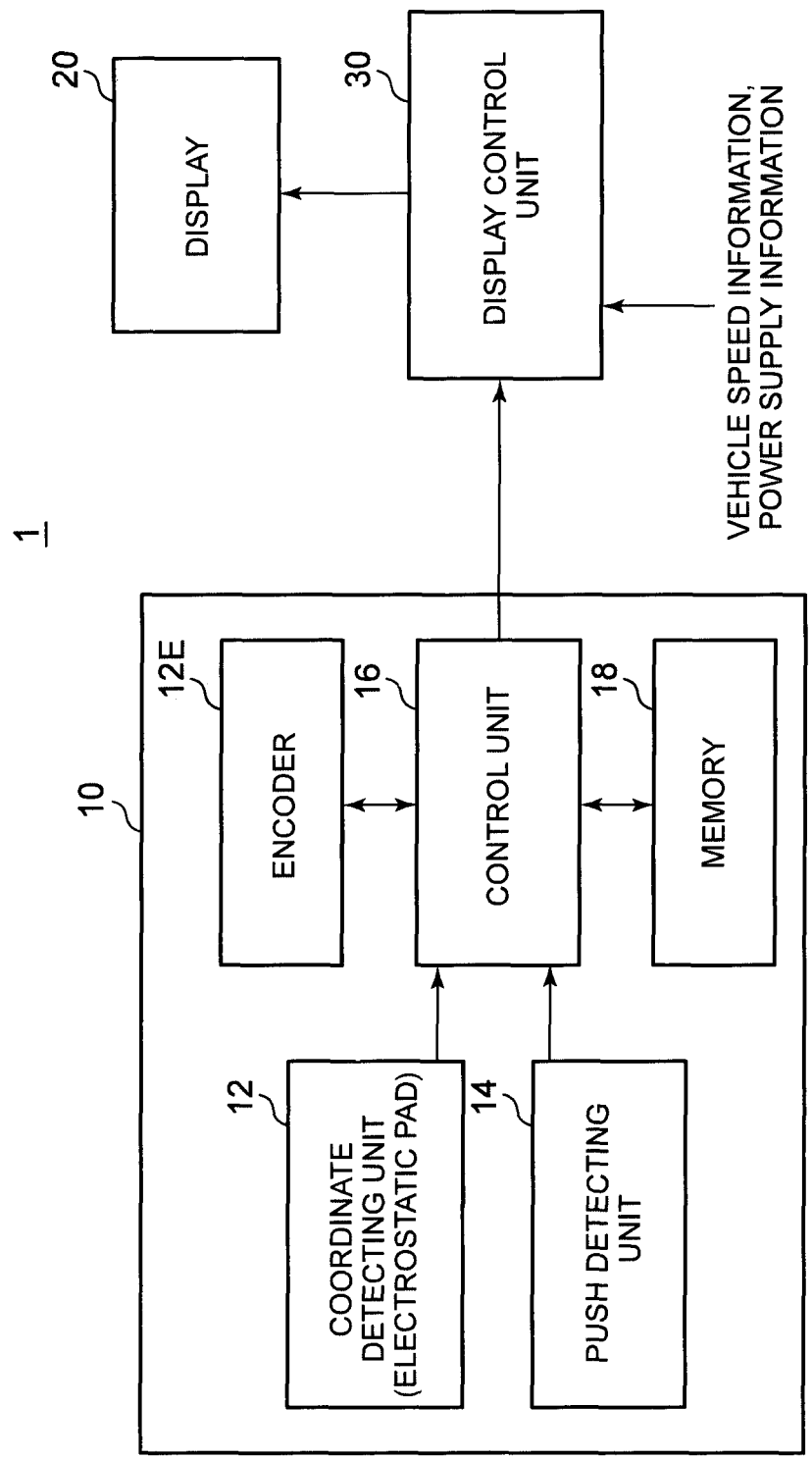
FIG. 9 is a block diagram illustrating a configuration example of an operating device for a vehicle according to a second embodiment.

FIG. 9 is a block diagram illustrating another configuration example of the operating device 1 for a vehicle. The operating device 1 for a vehicle according to this embodiment is different from the operating device 1 for a vehicle according to the first embodiment, in that it includes an encoder 12E.

The encoder 12E detects the position of the coordinate detecting unit 12 (the operation surface of the touch pad 10) in the vertical direction (the Z direction in FIG. 4). That is, the encoder 12E can measure (detect) the position at which the operation surface is located in the vertical direction when the operation surface of the touch pad 10 is pushed. The encoder 12E outputs a signal (position signal) corresponding to the position in the vertical direction of the operation surface of the touch pad 10 to the display control unit 30 via the control unit 16. The position signal may be directly output to the display control unit 30.

The characteristic processes in the operating device 1 for a vehicle according to this embodiment will be described below. Specifically, the process of determining a cursor position in consideration of movement of a touch position of an operating finger when an operator pushes the operation surface of the touch pad 10 will be described.

In the first embodiment, the updating of the cursor position is stopped within a predetermined amount of time T2 corresponding to the period of time from the detection of the push of the operation surface by the push detecting unit 14 to the returning of the operation surface to the original position. However, after the updating of the cursor position is stopped by the detection of the push of the operation surface by the push detecting unit 14, specifically, it is determined whether the operation surface is returned to the predetermined position and then the updating of the cursor position may be restarted. Therefore, in the operating device 1 for a vehicle according to this embodiment, the updating of the cursor position is stopped by the detection of the push of the operation surface of the touch pad 10 by the push detecting unit 14 and the updating of the cursor position is stopped until the returning of the operation surface to the predetermined position is detected by the encoder 12E.

Figure 10:
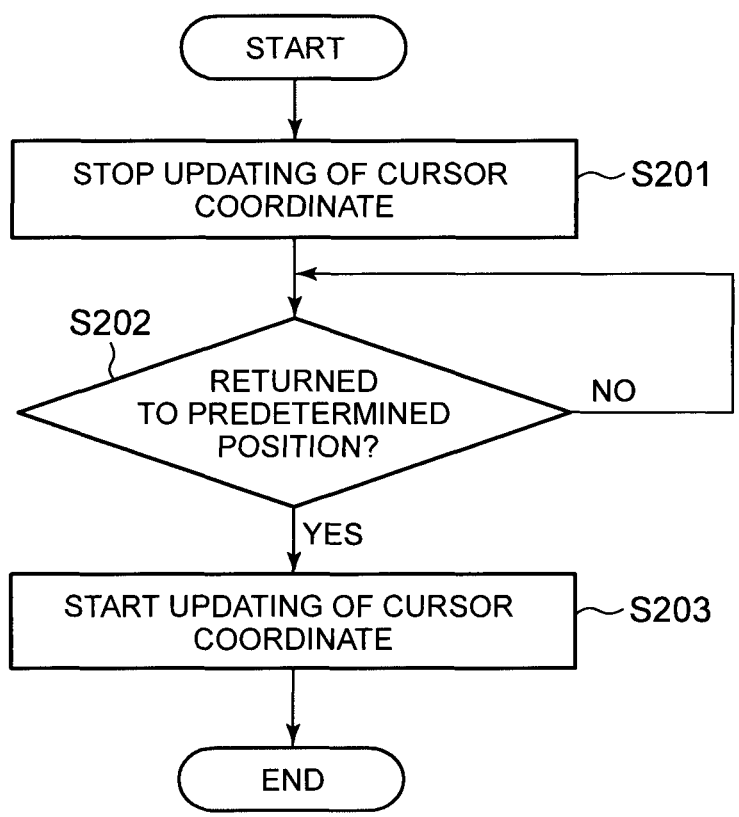
FIG. 10 is a flowchart illustrating an example of a process flow in the operating device (display control unit) for a vehicle according to the second embodiment.

FIG. 10 is a flowchart illustrating an example of a process flow in the operating device 1 for a vehicle (the display control unit 30) according to this embodiment and is specifically a flowchart illustrating the process flow of determining a cursor position at the time of performing the push operation. The process flow is carried out whenever a determination signal is input from the control unit 16 (whenever the push of the operation surface of the touch pad 10 is detected by the push detecting unit 14).

Referring to FIG. 10, in step S201, updating of the cursor position (the coordinate of the cursor on the screen of the display 20) is stopped.

Subsequently, in step S202, it is determined whether the operation surface of the touch pad 10 is returned to a predetermined position on the basis of the position signal (a signal corresponding to the position of the operation surface of the touch pad 10 detected by the encoder 12E) input from the control unit 16. When the operation surface is not returned to the predetermined position, the determination is repeatedly carried out until the operation surface of the touch pad 10 is returned to the predetermined position. When the operation surface of the touch pad 10 is returned to the predetermined position, the process flow moves to step S203.

In step S203, the updating of the cursor position based on the coordinate signal (the touch position of the operating finger on the operation surface detected by the coordinate detecting unit 12) input from the control unit 16 is restarted and the process flow ends.

The original position (first predetermined position) may be used as the predetermined position. The predetermined position may be determined by determining a position at which the coordinate (touch position) of the operating finger on the operation surface hardly varies at the time of performing the push operation in advance or the like (second predetermined position). That is, the predetermined position only has to be set in a range in which the movement of the cursor position due to the variation in the touch position of the operating finger at the time of performing the push operation can be suppressed.

In this way, by not updating the cursor position until the operation surface is returned to the predetermined position after the push of the operation surface of the touch pad 10 is detected, the same advantages as in the first embodiment can be achieved. Particularly, since the cursor position is not updated until the operation surface is returned to the predetermined position, it is possible to appropriately suppress the movement of the cursor position due to the variation in the touch position of the operating finger at the time of performing the push operation, for example, even when the push operation is performed by long push.

Third Embodiment

A third embodiment will be described below. Hereinafter, the same elements as in the first embodiment will be referenced by the same reference signs and different elements will be mainly described below.

The configuration of the operating device 1 for a vehicle according to this embodiment is illustrated in FIG. 1 as in the first embodiment and thus description thereof will not be repeated.

The characteristic processes in the operating device 1 for a vehicle according to this embodiment will be described below. Specifically, the process of determining a cursor position in consideration of movement of a touch position of an operating finger when an operator pushes the operation surface of the touch pad 10 will be described.

Figure 11:
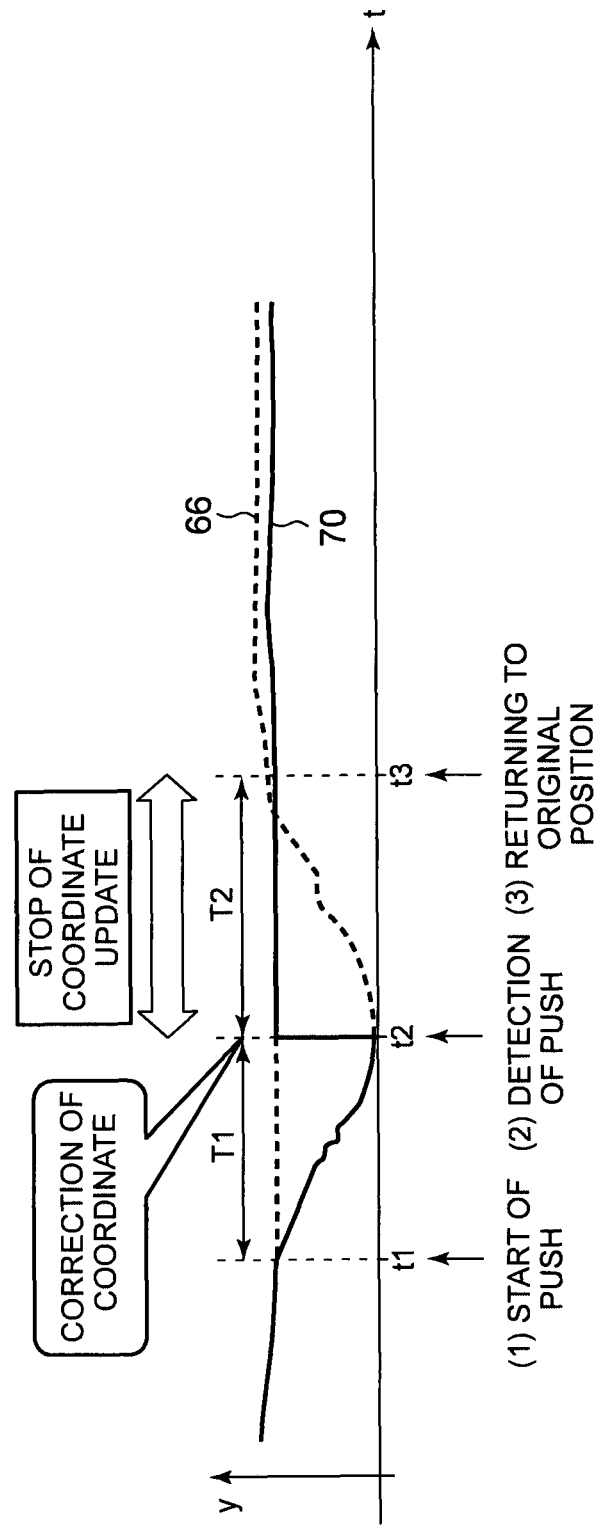
FIG. 11 is a diagram illustrating an operation example of an operating device (display control unit) for a vehicle according to a third embodiment.

FIG. 11 is a diagram illustrating an operation example of the operating device 1 for a vehicle (the display control unit 30) according to this embodiment. Specifically, FIG. 11 is a diagram illustrating an example of a temporal variation of the cursor position (Y coordinate in the XY coordinate system of the display 20) when the operator pushes the operation surface of the touch pad 10. Dotted line 66 represents the temporal variation of (the Y coordinate of) the cursor position that is determined depending on the coordinate signal input from the control unit 16 and solid line 70 represents the temporal variation of (the Y coordinate of) the cursor position when the process of determining the cursor position according to this embodiment is performed.

As described above, the coordinate indicating the touch position of the operating finger that is detected by the coordinate detecting unit 12 when the operation surface of the touch pad 10 is pushed may vary regardless of the operator's intention. Accordingly, like dotted line 66, when the cursor position is determined on the basis of the coordinate signal input from the control unit 16, the cursor position may vary with the variation of the touch position of the operating finger on the operation surface.

On the other hand, in the operating device 1 for a vehicle (the display control unit 30) according to this embodiment, when the push of the operation surface is detected by the push detecting unit 14 (when the determination signal is input from the control unit 16), the cursor position (coordinate) is corrected. Specifically, when the push of the operation surface is detected by the push detecting unit 14, the cursor position (coordinate) is corrected (returned) to a position before a predetermined amount of time T1. Thereafter, similarly to the first embodiment, the cursor position (coordinate) is not updated within the predetermined amount of time T2 after the push of the operation surface is detected by the push detecting unit 14. Here, the predetermined amount of time T1 can be determined as a period of time corresponding to the period of time from time t1 of (1) the start of the push operation to time t2 of (2) the detection of pushing of the operation surface by the push detecting unit 14. That is, in solid line 70, after the cursor position is corrected to the cursor position corresponding to the position at the time of starting the push operation, within the predetermined amount of time T2 from time t2 of (2) the detection of push of the operation surface by the push detecting unit 14, the cursor position (coordinate) is not updated and the cursor position does not vary within the predetermined amount of time T2 from time t2. After the predetermined amount of time T2 elapses from time t2 of (2) the detection of pushing of the operation surface by the push detecting unit 14, the updating of the cursor position based on the coordinate signal input from the control unit 16 is restarted.

Figure 12:
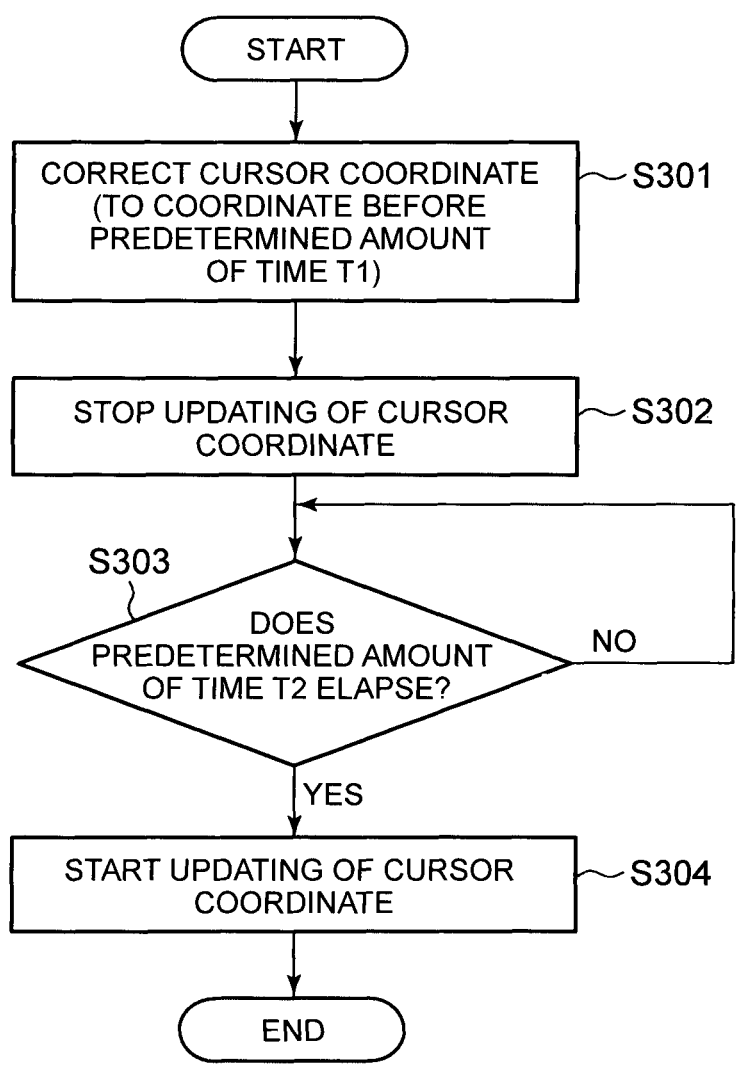
FIG. 12 is a flowchart illustrating an example of a process flow in the operating device (display control unit) for a vehicle according to the third embodiment.

FIG. 12 is a flowchart illustrating an example of a process flow in the operating device 1 for a vehicle (the display control unit 30) according to this embodiment and is specifically a flowchart illustrating the process flow of determining a cursor position when the operator pushes the operation surface (determining operation). More specifically, the processing operations in the display control unit 30 illustrated in FIG. 11 are illustrated as a process flow. The process flow is carried out whenever a determination signal is input from the control unit 16 (whenever the push of the operation surface of the touch pad 10 is detected by the push detecting unit 14).

Referring to FIG. 12, in step S301, the cursor position (the coordinate of the cursor on the screen of the display 20) is corrected to the position before the predetermined amount of time T1. The display control unit 30 can perform the correction by buffering the previous cursor position and the cursor position in a period of time longer than the predetermined amount of time T1 in an internal memory (not illustrated) thereof.

Subsequently, in step S302, updating of the cursor position (the coordinate of the cursor on the screen of the display 20) is stopped.

Subsequently, in step S303, it is determined whether a predetermined amount of time T2 elapses after a determination signal is input from the control unit 16 (after the push of the operation surface of the touch pad 10 is detected by the push detecting unit 14). When the predetermined amount of time T2 does not elapse, the determination is repeatedly carried out until the predetermined amount of time T2 elapses. When the predetermined amount of time T2 elapses, the process flow moves to step S304.

In step S304, the updating of the cursor position based on the coordinate signal (the touch position of the operating finger on the operation surface detected by the coordinate detecting unit 12) input from the control unit 16 is restarted and the process flow ends.

In this way, in the operating device 1 for a vehicle according to this embodiment, when the push of the operation surface of the touch pad 10 is detected, the cursor position is corrected to the position before the predetermined amount of time T1 and the cursor position is not updated within the predetermined amount of time T2. Accordingly, it is possible to suppress movement of the cursor position due to the variation in the touch position of the operating finger until the push of the operation surface is detected after the push of the operation surface is started in addition to movement of the cursor position due to the variation in the touch position of the operating finger until the operation surface is returned to the original position after the push of the operation surface is detected. Accordingly, it is possible to reduce an erroneous operation due to unintentional movement of the cursor.

In this embodiment, the correcting of the cursor position when the push operation is detected is added to the first embodiment, but the correcting of the cursor position when the push operation is detected may be added to the second embodiment. In this case, the same advantages can be achieved.

In this embodiment, the cursor position is corrected to the coordinate before the predetermined amount of time T1 corresponding to the time of starting the push operation when the push operation is detected, but the time point at which the push operation is started may be specified using the encoder 12E according to the second embodiment and the cursor position may be corrected to the coordinate at that time. That is, the cursor position may be corrected to the coordinate when it is detected using the encoder 12E that the downward movement of the operation surface of the touch pad 10 with the push operation is started. In this case, the same advantages can be achieved.

Fourth Embodiment

A fourth embodiment will be described below. Hereinafter, the same elements as in the first and second embodiments will be referenced by the same reference signs and different elements will be mainly described below.

The configuration of the operating device 1 for a vehicle according to this embodiment is illustrated in FIG. 9 as in the second embodiment and thus description thereof will not be repeated.

The characteristic processes in the operating device 1 for a vehicle according to this embodiment will be described below. Specifically, the process of determining a cursor position in consideration of movement of a touch position of an operating finger when an operator pushes the operation surface of the touch pad 10 will be described.

Figure 13:
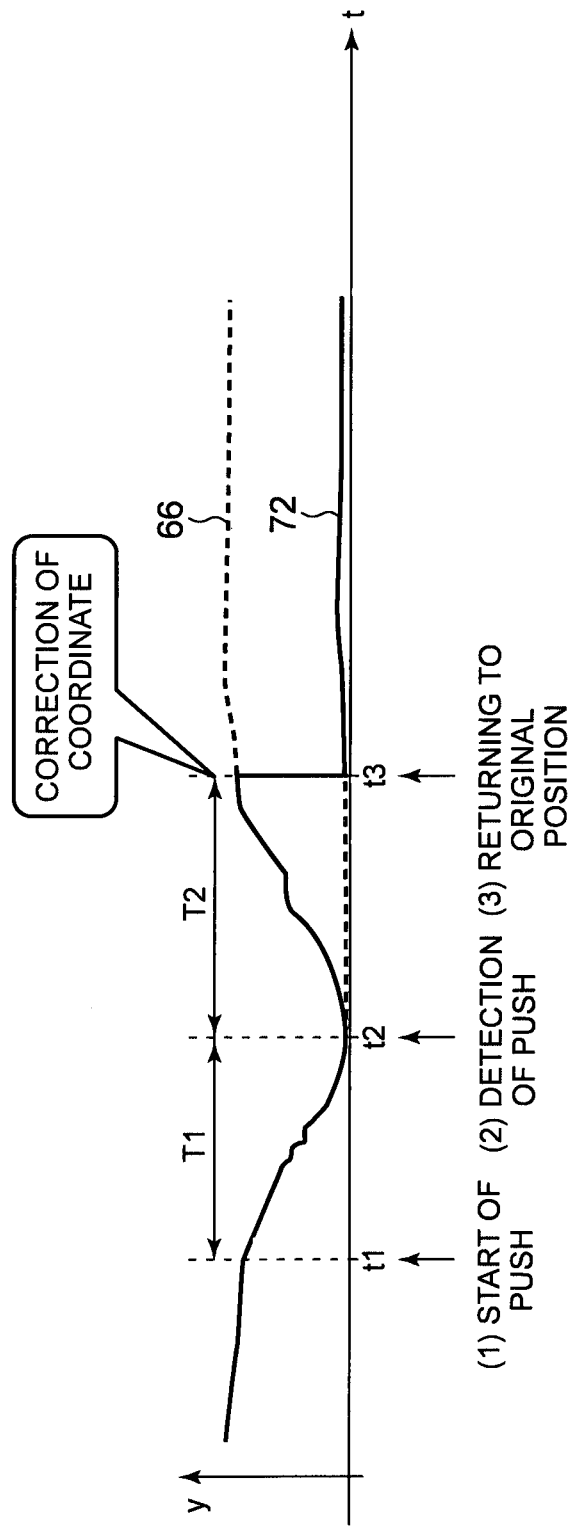
FIG. 13 is a diagram illustrating an operation example of an operating device (display control unit) for a vehicle according to a fourth embodiment.

FIG. 13 is a diagram illustrating an operation example of the operating device 1 for a vehicle (the display control unit 30) according to this embodiment. Specifically, FIG. 13 is a diagram illustrating an example of a temporal variation of the cursor position (Y coordinate in the XY coordinate system of the display 20) when the operator pushes the operation surface of the touch pad 10. Dotted line 66 represents the temporal variation of (the Y coordinate of) the cursor position that is determined depending on the coordinate signal input from the control unit 16 and solid line 72 represents the temporal variation of (the Y coordinate of) the cursor position when the process of determining the cursor position according to this embodiment is performed.

As described above, the coordinate indicating the touch position of the operating finger that is detected by the coordinate detecting unit 12 when the operation surface of the touch pad 10 is pushed may vary regardless of the operator's intention. Accordingly, like dotted line 66, when the cursor position is determined on the basis of the coordinate signal input from the control unit 16, the cursor position may vary with the variation of the touch position of the operating finger on the operation surface.

On the other hand, in the operating device 1 for a vehicle (the display control unit 30) according to this embodiment, when the returning of the operation surface to the original position is detected by the encoder 12E after the push of the operation surface is detected by the push detecting unit 14 (after the determination signal is input from the control unit 16), the cursor position (coordinate) is corrected. Specifically, when the returning of the operation surface to the original position is detected by the encoder 12E, the cursor position (coordinate) is corrected (returned) to a position before a predetermined amount of time T2. Here, the predetermined amount of time T2 can be determined as a period of time corresponding to the period of time from time t2 of (2) the detection of pushing of the operation surface by the push detecting unit 14 to time t3 of (3) the returning of the operation surface to the original position. That is, in solid line 72, at time t3 of (3) the returning of the operation surface to the original position, the cursor position is corrected to the position before the predetermined amount of time T2 (corresponding to time t2 of (2) the detection of pushing of the operation surface by the push detecting unit 14).

Figure 14:
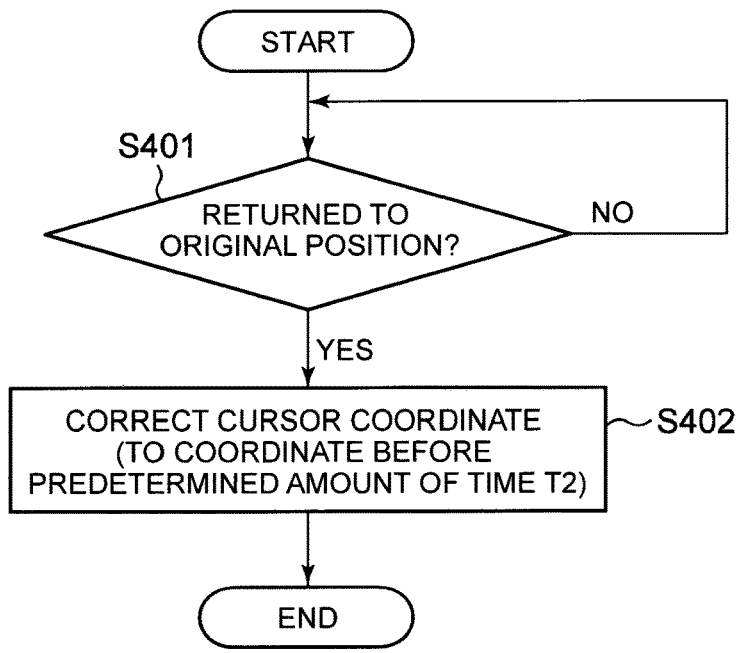
FIG. 14 is a flowchart illustrating an example of a process flow in the operating device (display control unit) for a vehicle according to the fourth embodiment.

FIG. 14 is a flowchart illustrating an example of a process flow in the operating device 1 for a vehicle (the display control unit 30) according to this embodiment and is specifically a flowchart illustrating the process flow of determining a cursor position when the operator pushes the operation surface (determining operation). More specifically, the processing operations in the display control unit 30 illustrated in FIG. 13 are illustrated as a process flow. The process flow is carried out whenever a determination signal is input from the control unit 16 (whenever the push of the operation surface of the touch pad 10 is detected by the push detecting unit 14).

Referring to FIG. 14, in step S401, it is determined whether the operation surface of the touch pad 10 is returned to the original position on the basis of the position signal input from the control unit 16 (the encoder 12E). When the operation surface is not returned to the original position, the determination is repeatedly performed. When the operation surface is returned to the original position, the process flow moves to step S402.

In step S402, the cursor position (the coordinate of the cursor on the screen of the display 20) is corrected to the position before the predetermined amount of time T2 and the process flow ends. The display control unit 30 can perform the correction by buffering the previous cursor position and the cursor position in a period of time longer than at least the predetermined amount of time T2 in an internal memory (not illustrated) thereof.

In this way, by correcting the cursor position to the position before the predetermined amount of time T2 when the returning of the operation surface to the original position is detected after the push of the operation surface of the touch pad 10 is detected, the same advantages as in the first embodiment can be achieved. That is, it is possible to suppress movement of the cursor position due to the variation in the touch position of the operating finger until the operation surface is returned to the original position after the push of the operation surface is detected. Accordingly, it is possible to reduce an erroneous operation due to unintentional movement of the cursor.

In FIGS. 13, 14, when the returning of the operation surface to the original position is detected, the cursor position is corrected to the position before the predetermined amount of time T2, but the cursor position may be specifically corrected to the position when the push of the operation surface is detected.

Figure 15:
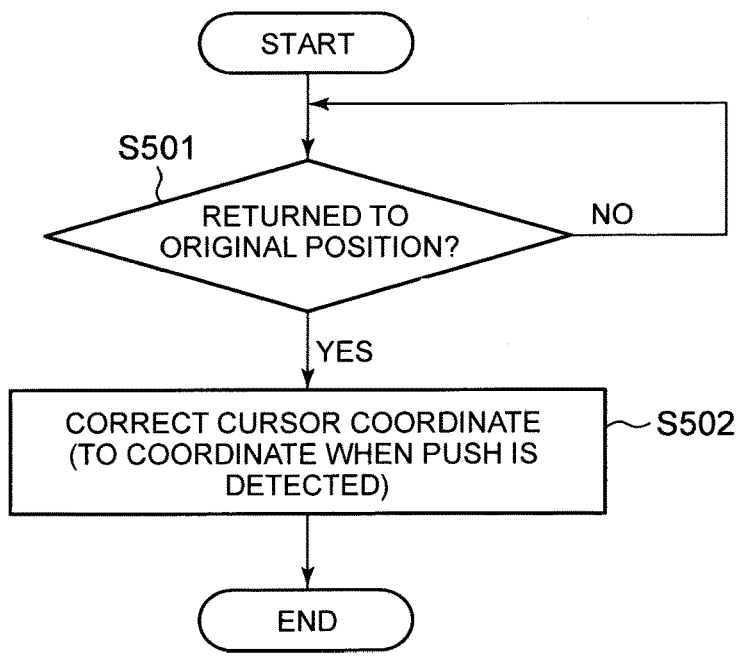
FIG. 15 is a flowchart illustrating another example of the process flow in the operating device (display control unit) for a vehicle according to the fourth embodiment.

FIG. 15 is a flowchart illustrating another example of the process flow in the operating device 1 for a vehicle (the display control unit 30) according to this embodiment and is specifically a flowchart illustrating the process flow of determining a cursor position when the operator pushes the operation surface (determining operation). The process flow is carried out whenever a determination signal is input from the control unit 16 (whenever the push of the operation surface of the touch pad 10 is detected by the push detecting unit 14).

Referring to FIG. 15, in step S501, it is determined whether the operation surface of the touch pad 10 is returned to the original position on the basis of the position signal input from the control unit 16 (the encoder 12E). When the operation surface is not returned to the original position, the determination is repeatedly performed. When the operation surface is returned to the original position, the process flow moves to step S502.

In step S502, the cursor position (the coordinate of the cursor on the screen of the display 20) is corrected to the position when the push of the operation surface is detected by the push detecting unit 14, and the process flow ends. The display control unit 30 can perform the correction by buffering the cursor position when the push of the operation surface is detected by the push detecting unit 14 in an internal memory (not illustrated) thereof.

In this way, by correcting the cursor position to the position when the push of the operation surface is detected, when the returning of the operation surface to the original position is detected after the push of the operation surface of the touch pad 10 is detected, the same advantages as in the second embodiment can be achieved.

Fifth Embodiment

A fifth embodiment will be described below. Hereinafter, the same elements as in the first and second embodiments will be referenced by the same reference signs and different elements will be mainly described below.

The configuration of the operating device 1 for a vehicle according to this embodiment is illustrated in FIG. 9 as in the second embodiment and thus description thereof will not be repeated.

The characteristic processes in the operating device 1 for a vehicle according to this embodiment will be described below. Specifically, the process of determining a cursor position in consideration of movement t1 of a touch position of an operating finger when an operator pushes the operation surface of the touch pad 10 will be described.

Figure 16:
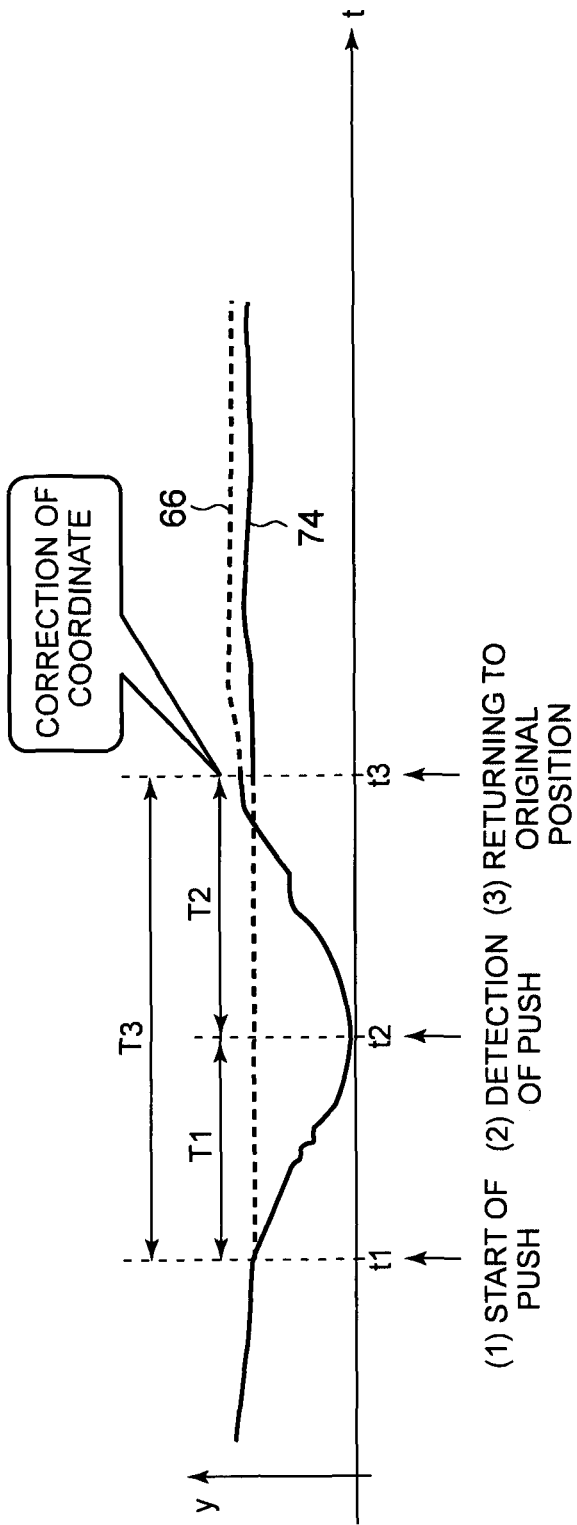
FIG. 16 is a diagram illustrating an operation example of an operating device (display control unit) for a vehicle according to a fifth embodiment.

FIG. 16 is a diagram illustrating an operation example of the operating device 1 for a vehicle (the display control unit 30) according to this embodiment. Specifically, FIG. 16 is a diagram illustrating an example of a temporal variation of the cursor position (Y coordinate in the XY coordinate system of the display 20) when the operator pushes the operation surface of the touch pad 10. Dotted line 66 represents the temporal variation of (the Y coordinate of) the cursor position that is determined depending on the coordinate signal input from the control unit 16 and solid line 74 represents the temporal variation of (the Y coordinate of) the cursor position when the process of determining the cursor position according to this embodiment is performed.

As described above, the coordinate indicating the touch position of the operating finger that is detected by the coordinate detecting unit 12 when the operation surface of the touch pad 10 is pushed may vary regardless of the operator's intention. Accordingly, like dotted line 66, when the cursor position is determined on the basis of the coordinate signal input from the control unit 16, the cursor position may vary with the variation of the touch position of the operating finger on the operation surface.

On the other hand, in the operating device 1 for a vehicle (the display control unit 30) according to this embodiment, when the returning of the operation surface to the original position is detected by the encoder 12E after the push of the operation surface is detected by the push detecting unit 14 (after the determination signal is input from the control unit 16), the cursor position (coordinate) is corrected. Specifically, when the returning of the operation surface to the original position is detected by the encoder 12E, the cursor position (coordinate) is corrected (returned) to a position before a predetermined amount of time T3. Here, the predetermined amount of time T3 can be determined as a period of time corresponding to the period of time from time t1 of (1) the start of the push operation to time t3 of (3) the returning of the operation surface to the original position. That is, in solid line 74, at time t3 of (3) the returning of the operation surface to the original position, the cursor position is corrected to the position before the predetermined amount of time T3 (corresponding to time t1 of (1) the start of the push operation).

Figure 17:
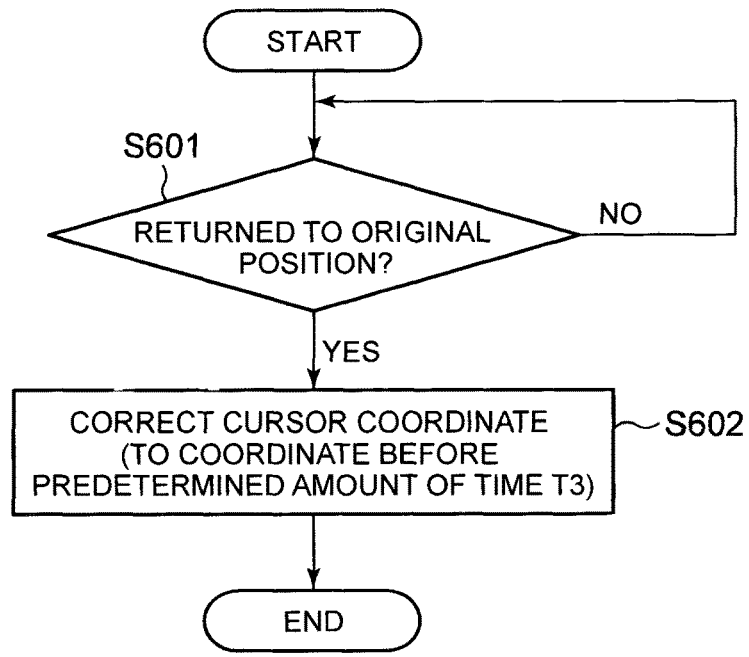
FIG. 17 is a flowchart illustrating an example of a process flow in the operating device (display control unit) for a vehicle according to the fifth embodiment.

FIG. 17 is a flowchart illustrating an example of a process flow in the operating device 1 for a vehicle (the display control unit 30) according to this embodiment and is specifically a flowchart illustrating the process flow of determining a cursor position when the operator pushes the operation surface (determining operation). More specifically, the processing operations in the display control unit 30 illustrated in FIG. 16 are illustrated as a process flow. The process flow is carried out whenever a determination signal is input from the control unit 16 (whenever the push of the operation surface of the touch pad 10 is detected by the push detecting unit 14).

Referring to FIG. 17, in step S601, it is determined whether the operation surface of the touch pad 10 is returned to the original position on the basis of the position signal input from the control unit 16 (the encoder 12E). When the operation surface is not returned to the original position, the determination is repeatedly performed. When the operation surface is returned to the original position, the process flow moves to step S602.

In step S602, the cursor position (the coordinate of the cursor on the screen of the display 20) is corrected to the position before the predetermined amount of time T3 and the process flow ends. The display control unit 30 can perform the correction by buffering the previous cursor position and the cursor position in a period of time longer than at least the predetermined amount of time T3 in an internal memory (not illustrated) thereof.

The cursor position may be corrected with the time point at which the push of the operation surface is detected by the push detecting unit 14 as a start point. That is, in step S602, the cursor position may be corrected to the position of the predetermined amount of time T1 before the push of the operation surface is detected by the push detecting unit 14. Here, the predetermined amount of time T1 can be determined as a period of time corresponding to the period of time from time t1 of (1) the start of the push operation to time t2 of (2) the detection of pushing of the operation surface by the push detecting unit 14.

In this way, by correcting the cursor position to the position before the predetermined amount of time T3 when the returning of the operation surface to the original position is detected after the push of the operation surface of the touch pad 10 is detected, the same advantages as in the third embodiment can be achieved. That is, it is possible to suppress movement of the cursor position due to the variation in the touch position of the operating finger until the push of the operation surface is detected after the push of the operation surface is started in addition to movement of the cursor position due to the variation in the touch position of the operating finger until the operation surface is returned to the original position after the push of the operation surface is detected. Accordingly, it is possible to reduce an erroneous operation due to unintentional movement of the cursor.

In FIGS. 16, 17, when the returning of the operation surface to the original position is detected, the cursor position is corrected to the position before the predetermined amount of time T3, but the cursor position may be specifically corrected to the position at the time of starting the push operation of the operation surface.

Figure 18:
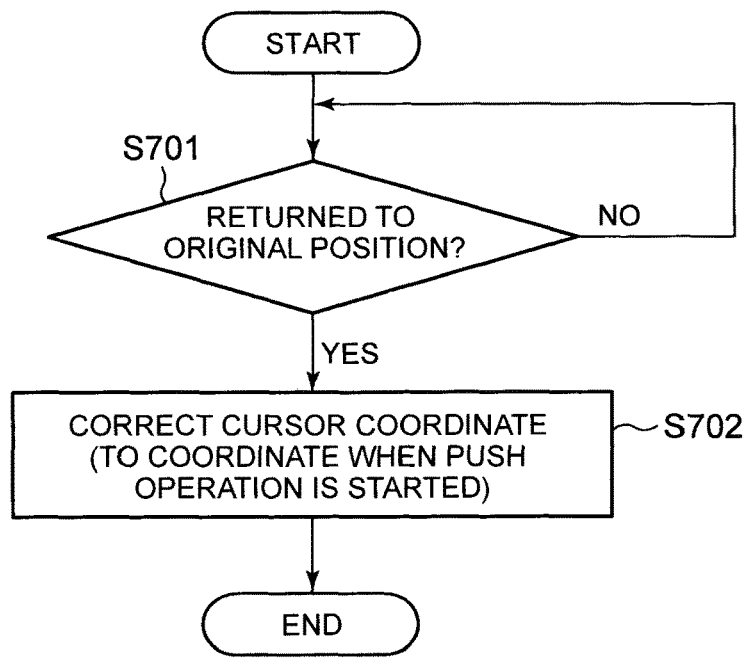
FIG. 18 is a flowchart illustrating another example of the process flow in the operating device (display control unit) for a vehicle according to the fifth embodiment.

FIG. 18 is a flowchart illustrating another example of the process flow in the operating device 1 for a vehicle (the display control unit 30) according to this embodiment and is specifically a flowchart illustrating the process flow of determining a cursor position when the operator pushes the operation surface (determining operation). The process flow is carried out whenever a determination signal is input from the control unit 16 (whenever the push of the operation surface of the touch pad 10 is detected by the push detecting unit 14).

Referring to FIG. 18, in step S701, it is determined whether the operation surface of the touch pad 10 is returned to the original position on the basis of the position signal input from the control unit 16 (the encoder 12E). When the operation surface is not returned to the original position, the determination is repeatedly performed. When the operation surface is returned to the original position, the process flow moves to step S702.

In step S702, the cursor position (the coordinate of the cursor on the screen of the display 20) is corrected to the position at the time of starting the push operation of the operation surface, and the process flow ends. The display control unit 30 can determine whether the push operation of the operation surface is started on the basis of the position signal input from the control unit 16 (the encoder 12E). The display control unit 30 can perform the correction by buffering the cursor position at the time of starting the push operation of the operation surface in an internal memory (not illustrated) thereof.

In this way, by correcting the cursor position to the position at the time of starting the push operation of the operation surface when the returning of the operation surface to the original position is detected after the push of the operation surface of the touch pad 10 is detected, the same advantages as in the aforementioned embodiments.

While the embodiments of the invention have been described in detail, the invention is not limited to the specific relevant embodiments, but can be modified in various forms.

What is claimed is:

1. An operating device for a vehicle, comprising:
   a display;
   a touch operation surface that is set at a first predetermined position and that is configured to be pushable and to be returned to the first predetermined position after being pushed;
   a coordinate detecting unit configured to detect a coordinate indicating a touch position of an operating finger on the touch operation surface;
   a push detecting unit configured to detect a push of the touch operation surface; and
   a control unit configured to display a cursor in a screen that is displayed on the display based on the coordinate detected by the coordinate detecting unit and to perform operation details of an item in the screen selected by the cursor based on the push of the touch operation surface detected by the push detecting unit, wherein:
   the control unit does not update a position of the cursor within a predetermined amount of time after the push detecting unit detects the push of the touch operation surface; and
   the control unit corrects the position of the cursor to a position before a second predetermined amount of time and does not update the position of the cursor when the push detecting unit detects the push of the touch operation surface, the second predetermined amount of time being from a time of a start of a push operation to a time of the push detecting unit detecting the push of the touch operation surface.

2. The operating device according to claim 1, further comprising a position detecting unit configured to detect a position of the touch operation surface in a push direction of the touch operation surface,
   wherein the control unit does not update the position of the cursor until the position detecting unit detects that the touch operation surface is returned to a second predetermined position after the push detecting unit detects the push of the touch operation surface.

3. The operating device according to claim 1, further comprising a position detecting unit configured to detect a position of the touch operation surface in a push direction of the touch operation surface,
   wherein the control unit does not update the position of the cursor until the position detecting unit detects that the touch operation surface is returned to the first predetermined position after the push detecting unit detects the push of the touch operation surface.

4. The operating device according to claim 1, wherein the coordinate detecting unit is an electrostatic capacitance sensor in communication with the control unit.

5. The operating device according to claim 1, wherein the push detecting unit is a pressure sensor.

* * * * *